H. H. EATON.
PIPE CUTTER.
APPLICATION FILED MAY 4, 1914.

1,162,905.

Patented Dec. 7, 1915.

UNITED STATES PATENT OFFICE.

HARRISON H. EATON, OF BEVERLY, MASSACHUSETTS.

PIPE-CUTTER.

1,162,905.   Specification of Letters Patent.   Patented Dec. 7, 1915.

Application filed May 4, 1914.   Serial No. 836,046.

*To all whom it may concern:*

Be it known that I, HARRISON H. EATON, a citizen of the United States, and resident of Beverly, in the county of Essex and State of Massachusetts, have invented new and useful Improvements in Pipe-Cutters, of which the following is a specification.

This invention relates to a pipe-cutter, and its object is to provide an improved and simplified hand operated implement for severing pipes by clean cutting action without distorting the pipe or changing its diameter adjacent to the line of cut, as usually happens with the tools now in common use.

The invention consists in the novel features of construction hereinafter described and particularly pointed out in the claims.

Figure 1:
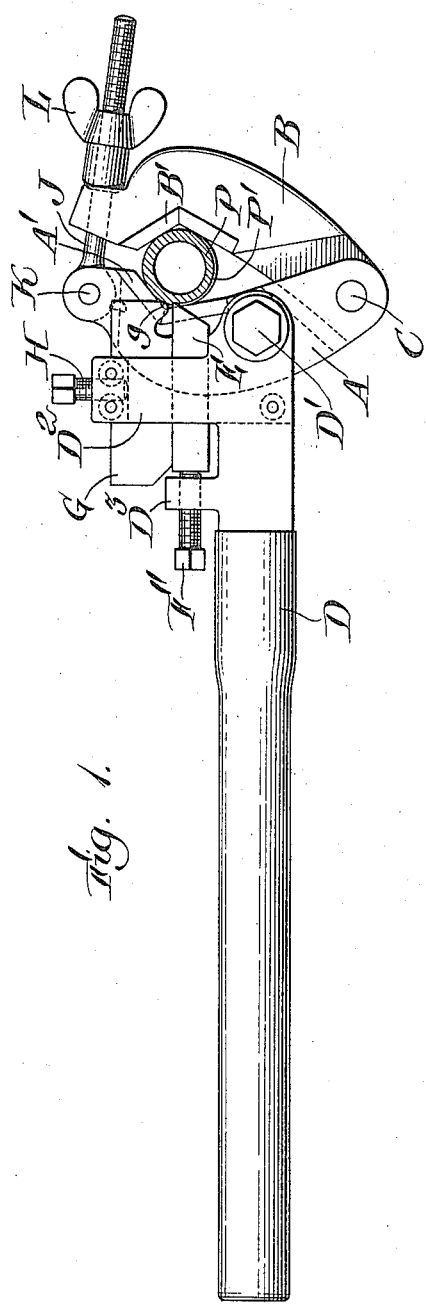
Figure 2:
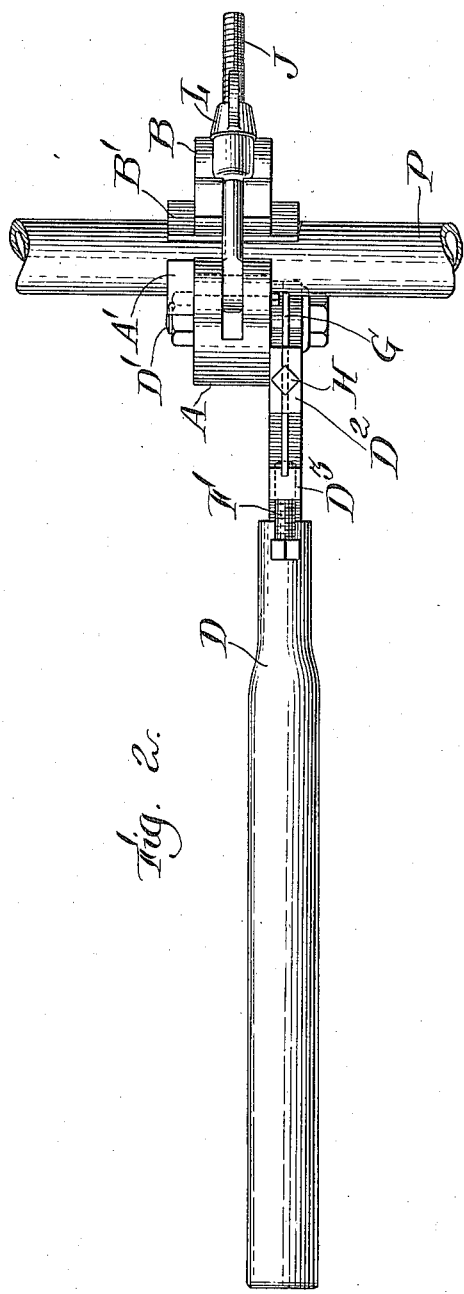

In the accompanying drawings which illustrate one embodiment of the invention,—Figure 1 is a side elevation of a pipe-cutter containing the invention; and Fig. 2 is a plan view of said pipe-cutter.

Referring to the drawings, A and B represent a pair of jaws pivoted together at C, each provided with broad pipe engaging holders A' and B', to insure a firm support for the pipe P and prevent it from becoming twisted or angularly displaced while being operated upon by the cutter.

D is the handle, pivoted to the side of jaw A by the bolt D', and provided with the laterally extending arm D² and lug D³. The arm D² is made with a slot running lengthwise of the device, in which are lodged a cutting tool E, which may be adjusted forward and backward with relation to the pipe by a set screw F, and the guide plate G, which is clamped against the tool E by set screw H, in the end of arm D². A clamping bolt J is pivoted to jaw A at K, and swings into engagement with the forked end of jaw B, whereby the jaws may be set up or clamped on to the pipe P, and held in closed position by thumb screw L. The cutting tool E is adjusted with relation to the guide plate G so that its cutting point or edge is a little in advance of the guide toe *g* of plate G. The depth of the cut is determined, and may be regulated by the distance which the point of tool E projects beyond the guide toe *g*.

In operation the jaws are placed on the pipe and the thumb screw L is set up on the clamping bolt J until the angular pipe holders A' and B' engage the pipe P firmly enough to prevent any lateral play of the pipe in the jaws, and to exert a slight friction on the pipe, but not enough to interfere with turning the implement on the pipe. The handle D is then swung upward, or in a clockwise direction, as viewed in Fig. 1, turning on its pivot D' until the cutting tool E engages the pipe. The cutting edge of the tool E is transverse of the direction of cut, and acts after the manner of a plane, or chisel, to remove a continuous shaving as the tool passes around the pipe. The mere act of swinging the handle in a clockwise direction about the pipe will force and hold the edge of cutter E in cutting engagement with the pipe, and cut out an annular groove or channel P', cleanly removing the shaving, and leaving the severed ends of the pipe sharply cut off and unchanged in diameter or otherwise distorted or displaced as they are when severed by roller cutters or blades running lengthwise of the direction of cut. The guide toe *g* moves in engagement with the pipe in advance of the cutter and, being thinner, or at most, no thicker than the breadth of the cutting edge of tool E, will freely enter the groove formed by the tool without binding and permit the tool to remove a continuous shaving of uniform thickness, progressively cutting deeper as the tool is revolved, until the pipe is severed. After the tool has been adjusted to the desired depth of cut, it will cut to that depth, and no more, without attention on the part of the user. The leverage necessary to force the tool into cutting engagement with the pipe is exerted by the handle D, acting through pivot D' as a fulcrum, which is between the pivoted end of the jaws and the cutting tool, the friction on the pipe exerted by the jaws A and B being sufficient to insure the swinging and holding of the tool E against the pipe.

The pipe cutter is adapted to pipes of various sizes by varying the spread of the jaws.

The broad supporting surface B', on the jaw opposed to the cutting tool, extends across the plane of the cutting tool, and so firmly supports the pipe opposite the tool, and counteracts any tendency of the thrust of the tool, which is at one side of jaw A, to twist the pipe out of its position perpendicular to the cutting plane.

I claim:

1. A pipe-cutter comprising a pair of pipe-engaging jaws pivoted together, a handle fulcrumed to said jaws, and a cutting tool rigidly carried and actuated by said handle adapted to be forced into cutting engagement with the pipe by swinging the handle on its fulcrum.

2. A pipe cutter comprising a pair of relatively movable pipe-engaging jaws, a handle pivoted to one of said jaws, a cutting tool rigidly fastened to said handle and adapted to be forced into cutting engagement with the pipe by swinging the handle on its pivot, and a guard rigidly secured to said handle adapted to bear on the pipe in advance of the cutting tool and limit the depth of cut thereof, and to follow the bottom of the groove formed by the cutting tool, whereby the cut may be continuously formed and the pipe wholly severed by revolving the implement upon the pipe without manual adjustment.

3. A pipe-cutter comprising a pair of pipe-engaging jaws pivoted together, a handle fulcrumed to said jaws, a cutting tool actuated by said handle adapted to be forced into engagement with the pipe by swinging the handle on its fulcrum, and a guide also actuated by the handle adapted to bear on the pipe in advance of the tool, said tool and guide being relatively adjustable to vary the depth of the cut.

4. A pipe-cutter comprising a pair of pipe-engaging jaws pivoted together, a handle fulcrumed to said jaws, a cutting tool actuated by said handle adapted to be forced into engagement with the pipe by swinging the handle on its fulcrum, and a guide also actuated by the handle adapted to bear on the pipe in advance of the tool, said guide being fixed on the handle, and said tool being adjustable on the handle to vary the depth of the cut.

5. A pipe-cutter comprising a pair of pipe-engaging jaws pivoted together, a handle fulcrumed to said jaws, a cutting tool actuated by said handle adapted to be forced into engagement with the pipe by swinging the handle on its fulcrum, and a guide also actuated by the handle adapted to bear on the pipe in advance of the tool, said guide being narrower than the breadth of the cutting edge of the tool whereby the guide will move freely along the groove formed by the tool.

6. A pipe-cutter comprising a pair of pipe-engaging jaws pivoted together, a handle fulcrumed to said jaws, and a cutting tool carried by said handle, the fulcrum of the handle being positioned between the pivoted end of the jaws and the cutting edge of the tool.

7. A pipe-cutter comprising a pair of pipe-engaging jaws pivoted together, a handle fulcrumed to said jaws having a laterally extending arm, and a cutting tool mounted in said arm adapted to be forced into engagement with the pipe by swinging the handle on its fulcrum.

8. A pipe-cutter comprising a pair of pipe-engaging jaws pivoted together, a handle fulcrumed to said jaws having a laterally extending arm provided with a slot extending lengthwise of the device, and a cutting tool and guide lodged in said slot, said cutting tool and guide being relatively adjustable.

9. A pipe cutter comprising a pair of pipe-engaging jaws pivoted together, a handle fulcrumed to the side of one of said jaws, and a cutting tool carried by said handle adapted to be forced into engagement with the pipe by swinging the handle on its fulcrum, the jaw opposed to the cutting tool having a pipe supporting surface which extends across the plane of the cutting tool.

10. A pipe cutter, comprising a pair of pipe engaging jaws, a handle fulcrumed to said jaws having a laterally extending arm provided with a slot extending lengthwise of the device, a cutting tool and guide lodged in said slot, and relatively adjustable, means mounted on said handle for adjusting said cutting tool, and means mounted on said arm to hold said tool and guide in adjusted position.

Signed by me at Boston, Massachusetts, this first day of May 1914.

HARRISON H. EATON.

Witnesses:
ROBERT CUSHMAN,
FLORENCE A. COLLINS.